(12) United States Patent
Chang

(10) Patent No.: US 7,943,676 B2
(45) Date of Patent: May 17, 2011

(54) METHOD OF RECYCLING WASTE PLASTIC FOAM MATERIALS

(76) Inventor: Kun-Huang Chang, Taichung County (TW)

( * ) Notice: Subject to any disclaimer, the term of this patent is extended or adjusted under 35 U.S.C. 154(b) by 106 days.

(21) Appl. No.: 12/027,517

(22) Filed: Feb. 7, 2008

(65) Prior Publication Data

US 2009/0170970 A1 Jul. 2, 2009

(30) Foreign Application Priority Data

Jan. 2, 2008 (TW) ................................ 97100118 A

(51) Int. Cl.
*C08J 11/04* (2006.01)
(52) U.S. Cl. ............. 521/49.5; 521/40; 521/49; 521/50; 521/53; 521/56; 521/60; 521/72; 521/82; 521/88; 528/480; 528/495; 528/499; 528/500; 528/503
(58) Field of Classification Search ........... 264/51, 264/54, 321; 521/60, 63, 64, 72, 88, 82, 521/137, 138, 155, 40, 40.5, 47, 48, 41, 48.5, 521/49, 49.5; 528/480, 495, 499, 500, 503
See application file for complete search history.

(56) References Cited

U.S. PATENT DOCUMENTS 4,061,701 A * 12/1977 Stastny et al. .............. 264/51
5,204,040 A * 4/1993 Chang ........................ 264/51

FOREIGN PATENT DOCUMENTS

GB 2116572 * 9/1983

* cited by examiner

*Primary Examiner* — James Seidleck
*Assistant Examiner* — Frances Tischler
(74) *Attorney, Agent, or Firm* — Browdy and Neimark, PLLC

(57) ABSTRACT

A method of recycling waste plastic foam materials firstly is to smash a waste material including polyurethane foam into fine particles so as to obtain a first starting material. The first starting material is then crisped and followingly milled into powder so as to obtain a second starting material. The second starting material is then placed into a mixer to mix with a first foaming reaction solution including polyol, catalyst and additives injected into the mixer so as to form a semi-treated foaming material. And then, the semi-treated foaming material is mixed with a second foaming reaction solution including diisocyanate injected into the mixer so as to obtain a completed-treated foaming material. Lastly, the completed-treated foaming material is poured into a mold and then water vapor is uniformly introduced into the mold so as to induce the completed-treated foaming material to proceed foaming reaction.

11 Claims, 2 Drawing Sheets

METHOD OF RECYCLING WASTE PLASTIC FOAM MATERIALS

BACKGROUND OF THE INVENTION

1. Field of the Invention

The present invention relates generally to a method of recycling waste plastic materials, and more particularly to a method of recycling waste plastic foam materials including polyurethane foam materials and un-polyurethane foam materials.

2. Description of the Related Art

It is well known that use of polyurethane foam intermixed with un-polyurethane foam materials, such as nylon, polyester, cellulose films, glass fibers, and even natural fiber layers, as a daily article, for example, vehicle seats or shoe pads, has been increasing dramatically; and with this increase, there has developed a serious problem in disposing of waste foam materials.

In prior art, a method introduced to dispose foam waste was to take polyurethane foam, only the foam, from foam waste materials and grind it into a powder, and then mix such powder with a foamable polyurethane resin to produce a useful polyurethane foam material.

The drawback of the method mentioned above is that it is very difficult and not cost effective to separate only polyurethane foam from foam waste materials since they include so many distinct materials.

SUMMARY OF THE INVENTION

The present invention is therefore based on the task of creating a method with which a new foam material can be produced without separating polyurethane foam from waste materials.

The present invention has an important objective that is to produce a new foam material with nanometered meshes.

The present invention generally includes the steps of taking a waste material including polyurethane foam and then smashing it into particles in the desired range so as to obtain a first starting material. The first starting material is then crisped until the residual moisture thereof is 2% or less. The crisped first starting material followingly is milled into fine powder so as to obtain a second starting material. The second starting material is then mixed with a first foaming reaction solution including polyol, catalyst and additives by injecting the first foaming reaction solution into a mixer in which the second starting material is placed so as to form a semi-treated foaming material. And then, the semi-treated foaming material is mixed with a second foaming reaction solution including diisocyanate by injecting the second foaming reaction solution into the mixer so as to obtain a completed-treated foaming material. In the present invention, the quantity of the second foaming reaction solution must be less than that of the first foaming reaction solution. After that, the completed-treated foaming material is poured into a mold, and then introducing water vapor uniformly into the mold so as to induce the completed-treated foaming material to proceed foaming reaction.

DETAILED DESCRIPTION OF THE INVENTION

Figure 1:
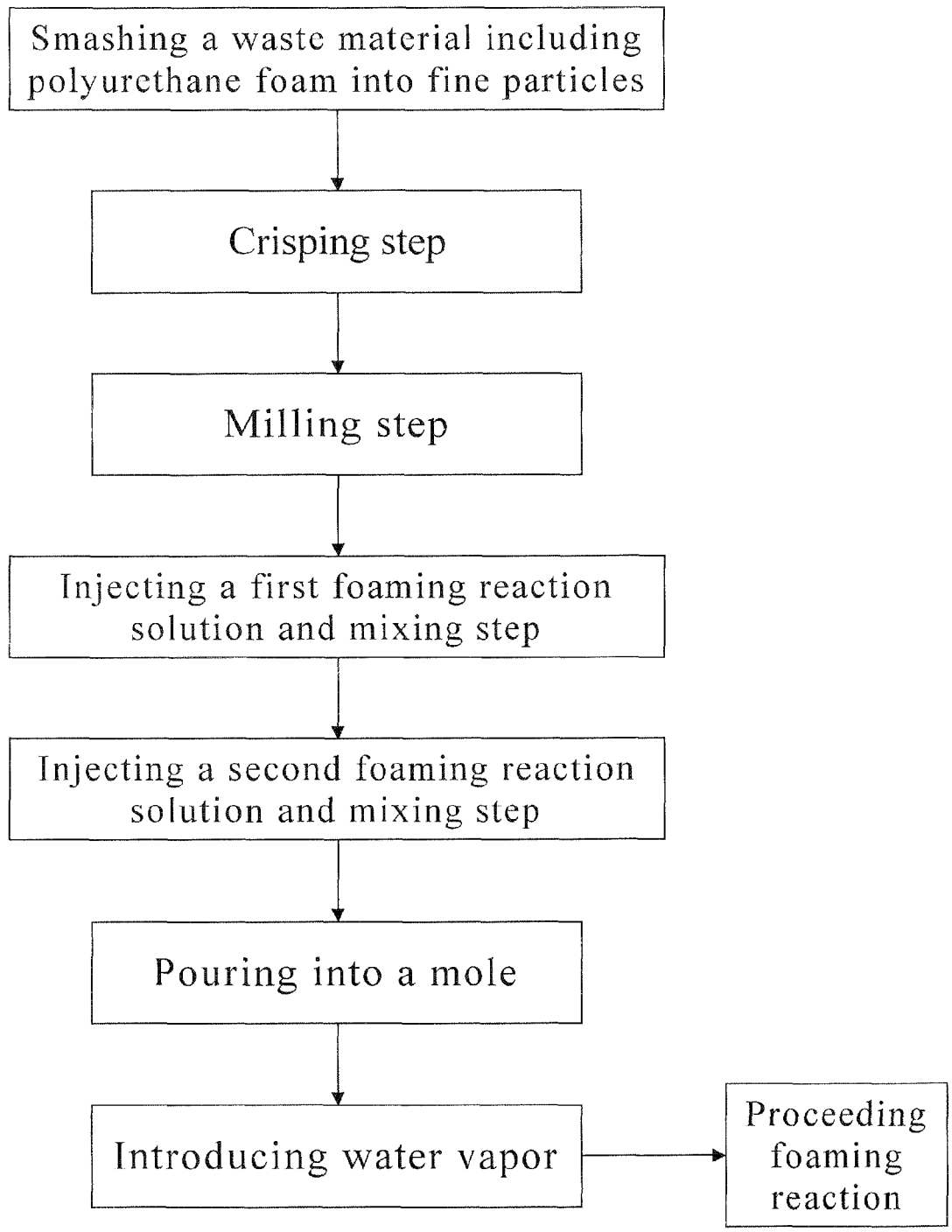
FIG. 1 shows a flow chart depicting the steps of the present invention.

Referring to the drawings, one preferred embodiment according to the present invention firstly takes a plurality of waste shoe pads each of which includes a body made of polyurethane foam and a cloth layer attached on the body, and then smashes the waste shoe pads into particles in a diameter between 2.5 mm and 3 mm so as to obtain a first starting material.

Secondly, the first starting material is transported via a conveyor into a roasting installation (not shown in the drawings) and then roasted therein at a temperature between 80 Ge and 100 Ge for a period of time. After the roasting process, the first starting material has been crisped in a state that the residual moisture thereof is only 1%. The time required for the roasting process is dependent on the quantity of the first starting material to be crisped.

The crisped first starting material is then milled by a milling machine into nanometered powder so as to obtain a second starting material. In this embodiment, the diameter of the second starting material is preferably under 0.5 mm.

And then, the second starting material is arranged into a mixer and then a first foaming reaction solution including polyol, catalyst and additives injects into the mixer to proceed a first mixing process for a period of time until the second starting material is mixed uniformly with the first foaming reaction solution so as to obtain a semi-treated foaming material.

Thereafter, a second foaming reaction solution including diisocyanate (TDI) injects into the mixer to proceed a second nixing process for a period time until the semi-treated foaming material is mixed uniformly with the second foaming reaction solution so as to obtain a completed-treated foaming material. In this embodiment, the quantity of the first foaming reaction solution is about three times of that of that second foaming reaction solution.

Lastly, the completed-treated foaming material is poured into a mold 10, in this embodiment, which is a cylinder tank with a center pipe 12 having a plurality of apertures 14 on the wall thereof. And then sub-saturated water vapor V' supplied from a pipeline 20 introduces into the pipe 12 in such a way that it spouts outwardly and uniformly through the apertures 14 of the pipe 12 to the internal room of the mold 10 to induce the completed-treated foaming material to proceed foaming reaction.

Figure 2:
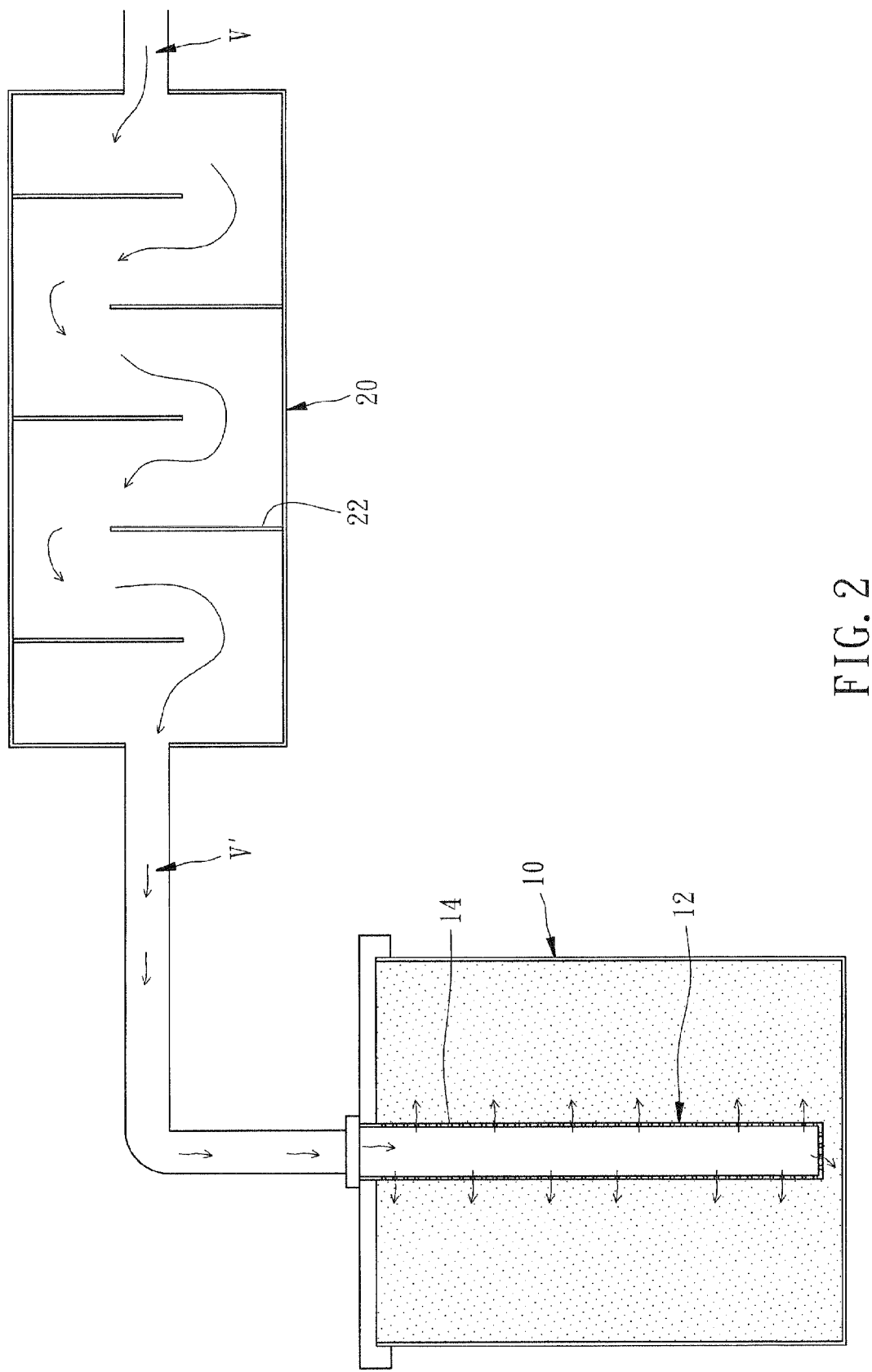
FIG. 2 shows an installation for processing the present invention.

In this embodiment, the sub-saturated water vapor V' is transferred from a saturated water vapor V. As shown in FIG. 2, the saturated water vapor V generated from a steam-generating device (not shown in the drawings) is introduced into the pipeline 20 with a plurality of stoppers 22 disposed at intervals on the internal wall thereof. After that, the temperature of the saturated water vapor V is decreased to transfer from a saturated state into a sub-saturated state.

According to the disclosed above, it is therefore readily apparent that one of advantages of the present invention is that there has no step to separate polyurethane foam from waste material so that the waste foam material can be recycled in a cost effective way. Another advantage of the present invention is that for having the nanometered second starting material, the recycling foam material made from the present invention has nanometered meshes. And the result is that it has an excellent air permeability when comparing with prior art materials.

What is claimed is:

1. A method of recycling waste plastic foam materials, comprising the steps of:

smashing a waste material including a polyurethane foam and non-polyurethane material into fine particles so as to obtain a first starting material;

crisping said first starting material;

milling the so-crisped material into powder so as to obtain a second starting material;

mixing said second starting material with a first foaming reaction solution including polyol, catalyst and additives so as to obtain a semi-treated foaming material;

mixing said semi-treated foaming material with a second foaming reaction solution including diisocyanate so as to obtain a completed-treated foaming material, wherein said second foaming reaction solution has a quantity less than that of said first foaming reaction solution;

pouring said completed-treated foaming material into a mold in the form of a cylindrical tank including a center pipe with a plurality of apertures disposed in a wall thereof; and introducing water vapor in a sub-saturated state uniformly into said mold through the plurality of apertures in the wall of the center pipe so that said sub-saturated water vapor spouts outwardly from the apertures of the center pipe into the interior of the mold so as to induce said completed treated foaming material to produce a foaming reaction.

2. The method of claim 1, wherein said first starting material has a diameter smaller than 3 mm.

3. The method of claim 1, wherein said crisping step is to roast said first starting material at a temperature between 80° C. and 100° C. for a predetermined time.

4. The method of claim 3, wherein the starting material is crisped to a residual moisture content of about 1%.

5. The method of claim 1, wherein said second starting material has a diameter smaller than 0.5 mm.

6. The method of claim 1, wherein the quantity of said first foaming reaction solution is about three times that of said second foaming reaction solution.

7. The method of claim 1, wherein said crisping reduces the residual moisture to 2% or less.

8. The method of claim 7, wherein said first starting material has a diameter smaller than 3 mm.

9. The method of claim 7, wherein said crisping step is to roast said first starting material at a temperature between 80° C. and 100° C. for a predetermined time.

10. The method of claim 7, wherein said second starting material has a diameter smaller than 0.5 mm.

11. The method of claim 7, wherein the quantity of said first foaming reaction solution is about three times that of said second foaming reaction solution.

* * * * *